United States Patent Office 2,949,700
Patented Aug. 23, 1960

2,949,700

PRODUCTION OF CAROTENOIDS BY THE CULTIVATION OF ALGAE

Henry R. Kathrein, Muscatine, Iowa, assignor to Grain Processing Corporation, Muscatine, Iowa, a corporation of Iowa No Drawing. Filed July 21, 1958, Ser. No. 749,586

20 Claims. (Cl. 47—58)

This invention relates to methods for the production of carotenoids. More specifically, this invention relates to an improved method for the production of beta-carotene and xanthophyll by the cultivation of a "grass green" alga of the botanical division Chlorophyta, and particularly to methods involving cultivation of algae in an aqueous organic medium using urea as a supplementary source of nitrogen.

Generally it has been known that algae and particularly algae of the genus Chlorella may be propagated under mass culture conditions using a synthetic nutrient medium.

In some instances the growth medium was composed of inorganic nutrients and used potassium nitrate, ammonium nitrate or ammonia as a source of fixed nitrogen. The culture of the algae was carried out under autotrophic conditions requiring a source of carbon dioxide and maximum light conditions for favorable growth. In other instances, cultivation of algae has been carried out in an organic nutrient medium using an inorganic nitrogen source such as potassium nitrate under heterotrophic conditions. Carotene and xanthophyll were produced in low yield both in the presence of light and in darkness.

Since carotene and xanthophyll have a number of uses including that of a pigmentation factor for poultry, organic pigments for food coloration, and as chemical intermediates in the production of vitamins, it would be desirable to provide a process for their production which would be both efficient and economical.

Disadvantages of the prior art methods for the cultivation of algae included both low yields of cells and carotenoids, and extended periods of time were required to produce a relatively small quantity of product.

Accordingly, one of the objects of the present invention is the provision of an improved process for the production of carotenoids by the cultivation of algae which results in high yields of beta-carotene and xanthophyll.

Another object is the provision of a method for the production of carotene and xanthophyll in high yield by the cultivation of algae under heterotrophic conditions.

A still further object is the provision of a process for the production of carotenoids by the cultivation of algae which requires a relatively short period of time.

These and other objects will be more clearly understood by reference to the following specification and appended claims.

It has been found that the foregoing objects may be fulfilled by the cultivation of algae in an aqueous organic nutrient medium using urea as a supplementary source of fixed nitrogen.

Accordingly, in one broad form the process of the present invention involves the cultivation of a "grass-green" alga of the division Chlorophyta in an aqueous organic nutrient medium. The organic nutrient medium of this process includes a carbohydrate, a proteinaceous material, and urea as a source of fixed nitrogen.

While the present process broadly includes algae of the division Chlorophyta, it is a preferred procedure to use an alga of the order Chlorococcales, family Oöcystaceae, and genus Chlorococcum or Chlorella, of which latter genus the most preferred are the species *vulgaris* and *pyrenoidosa*. The carbohydrate portion of the nutrient may be any assimilable starch or sugar such as glucose, dextrin, mannose, sorbose, arabinose, xylose, levulose, lactose, cellobiose, maltose, rhamnose, raffinose and the like. Similarly the protein nutrient is preferably a water soluble proteinaceous material, such as, for example, distiller's solubles syrup, soy albumin, lactalbumin, beef extract, whey, yeast hydrolyzate, casein hydrolyzate, corn steep liquor, enzymatically degraded collagenous material, or peptones in general. Generally the amounts of carbohydrate, proteinaceous material and urea are variable. Thus, carbohydrate utilized may vary from about 0.5 to about 10% by weight (dry) of the aqueous nutrient solution, a most preferred amount being from about 2% to 3% by weight. The proteinaceous material may be utilized in the nutrient solution in an amount from about 0.1 to 5 percent calculated on a dry weight basis, and preferably from about 0.4 to about 2.4 weight percent. The ratio of proteinaceous material to carbohydrate should preferably be from 0.4 to 0.8 weight percent for each 1 percent of carbohydrate. Urea is used in amounts ranging from about 0.05 to about 4 weight percent, a most preferred range being from 0.2 to 1.2 weight percent. Generally, the urea should be present in an amount corresponding to from 0.1 to 0.2 percent for each 1 percent of carbohydrate, although as high as 0.4 percent also produces satisfactory results.

The process of the present invention is preferably carried out at temperatures of from about 20° to 25° C., but temperatures of from 10° to 40° C. are also employed with good results. The pH does not appear to be a critical factor and accordingly the initial pH of the medium may range from as low as 5.8 to as high as 9.0 and a pH of from about 6.6 to 6.8 may be regarded as optimum. The length of time which is required for the production of good yields of beta-carotene and xanthophyll by the cultivation of algae may range from about 5 to about 15 days; however, under optimum conditions maximum growth and carotenoid yield are achieved in from about 6 to 11 days.

It is preferred that the process of the present invention be carried out under heterotrophic conditions and accordingly, since photosynthesis is not involved, a source of carbon dioxide is not required. However, the process is preferably carried out by accompanying aeration and agitation. It should also be noted that high illumination, as is the case under autotrophic conditions, is not necessary in this process, and good yields of carotenoids are obtained in the absence of light; however it is a preferred procedure that the process be carried out under low light conditions.

It should also be understood that while the foregoing description sets forth the basic nutrients to be utilized in the process of the present invention, it is also a part of this invention to include the necessary micronutrients and trace elements (which are well known to those skilled in this art) and which are required for proper proliferation and growth of the algae.

A clearer understanding of this invention may be had by reference to the following specific examples showing the production of beta-carotene and xanthophyll by processes of the present invention.

Preparation of Inoculum

The stock cultures of an alga of the genus Chlorococcum were maintained on a medium containing glucose (1.0%), malt extract (0.3%), yeast extract (0.3%), Bacto peptone (0.5%) and agar (1.5%). The inoculum was prepared in the following manner: A loopful of a seven to ten day old Chlorococcum culture was taken from the above solid medium and transferred to a test tube containing 7 milliliters of the same medium without the agar. The test tube was agitated 6 to 7 days on a reciprocal shaker. The contents of this tube were then transferred to 100 milliliters of the same medium contained in a 500 milliliter Erlenmeyer flask and allowed to agitate 6 to 7 days on a reciprocal shaker. Prior to use of this culture for inoculation, the algae were broken up by means of a Waring micro blender.

The medium employed for the culturing of algae contains carbohydrate, source, in this case dextrose, at levels from 1.0% to 5.0%. Corn steep liquor or Wilson's 159 peptone (enzymatically degraded collagen) was the main source of nitrogen at levels of 0.4% to 2.0% supplemented with urea at levels of 0.1% to 1.0%. In addition to the above nutrients, the medium contains sodium acetate (0.1% to 0.2%) and low levels of the mineral salts potassium dihydrogen phosphate, magnesium sulfate, calcium chloride and ferric sulfate. Micronutrients were also added. The medium was made up with demineralized water excluding the urea which was added after sterilization. The medium was adjusted to a predetermined pH dependent upon dextrose, corn steep liquor and urea level employed. 100 milliliters of the medium were measured into 500 milliliter Erlenmeyer flasks and the flasks sterilized 25 minutes at 121° C. After cooling, the urea was added to the individual flasks and the flasks were then inoculated with the above described inoculum. The flasks were aerated and agitated on a rotary or reciprocal shaked in a walk-in incubator adjusted to 23° to 24° C. Light conditions consisted of two sets of ceiling fixtures, each possessing two 75 watt incandescent bulbs. Growth period varied from 7 to 11 days dependent upon the dextrose level of the medium. The carotene and xanthophyll content of the resulting algae cells was determined by the procedure of Bickoff, et al., J.A.O.A.C. 37, 894 (1954).

The following specific examples are illustrative of the procedures described:

EXAMPLE 1

A series of culture media were made up containing 1.0% dextrose as carbohydrate source and 0.4% corn steep liquor (0.2% corn steep solids) and enzymatically degraded collagen (Wilson's 159) as protein source. The corn steep liquor and W-159 were supplemented with varying levels of urea which were added to the medium after sterilization. Other additions to the medium were: sodium acetate 0.1%, ammonium nitrate 0.01%, potassium dihydrogen phosphate 0.004%, magnesium sulfate 0.004%, calcium chloride 0.002%, and ferrous sulfate 0.00001%. After the pH's of the media were adjusted to predetermined levels dependent upon the amount of urea to be added, duplicate flasks of 100 milliliters per 250 milliliter flask were prepared and sterilized 25 minutes at 121° C. Urea was added to the flasks after cooling. The flasks were inoculated with 1.0% by volume of a 7 day liquid culture of the algal culture, Chlorococcum. They were aerated and agitated on a small rotary shaker (250 r.p.m.) for 7 days at approximately 25° C. A fluorescent light fixture possessing two 40 watt tubes was suspended approximately 2 feet above the shaker. At termination, dry weights were made on the contents of the flasks and carotene and xanthophyll determinations made on the centrifuged cells. As shown in the table below, urea provided a definite stimulation to carotenoid production both with corn steep liquor and Wilson's 159.

TABLE 1

[The effect of varying levels of urea upon the carotenoid production by the algal culture of Chlorococcum.]

| Dextrose, Percent | Corn Steep Liquor, Percent | W-159,[1] Percent | Urea, Percent | Dry Wt. of Cells, g./l. med. | Beta-carotene mcg./g. wet cells | Xanthophyll mcg./g. wet cells |
|---|---|---|---|---|---|---|
| 1.0 | 0.4 | | 0 | 4.33 | 52.5 | 198.6 |
| 1.0 | 0.4 | | 0.1 | 3.51 | 112.5 | 389.5 |
| 1.0 | 0.4 | | 0.2 | 3.77 | 105.0 | 302.0 |
| 1.0 | | 0.4 | 0 | 4.76 | 45.0 | 166.9 |
| 1.0 | | 0.4 | 0.1 | 4.82 | 60.0 | 222.5 |
| 1.0 | | 0.4 | 0.2 | 4.78 | 90.0 | 349.5 |

[1] Wilson's-159 (Enzymatically degraded collagen).

EXAMPLE 2

A series of culture flasks were made up containing 1.0% dextrose and two different levels of corn steep liquor, 0.4% and 0.8%. The corn steep liquor was supplemented with varying levels of urea (0.0–0.3%) added after sterilization of the basal medium. Other medium ingredients were: Sodium acetate 0.1%, $NH_4NO_3$ 0.01%, $KH_2PO_4$ 0.004%, $MgSO_4$ 0.004%, $CaCl_2$ 0.002%, $FeSO_4$ 0.00001%, ethylene diamine tetra-acetic acid 0.003%, and micronutrient solution 0.1%. After the pH's of the media were adjusted to predetermined levels dependent upon the amount of urea to be added, duplicate flasks of 100 milliliters per 500 milliliter flask of each medium were prepared. After sterilization for 25 minutes at 121° C., urea was added and the flasks inoculated with 2.0% by volume of a 7 day liquid algal culture of the genus Chlorococcum. They were aerated and agitated on a reciprocal shaker for 7 days at 23° to 24° C. Light conditions consisted of two sets of ceiling fixtures each possessing two 75 watt incandescent bulbs approximately 5 feet above the shaker. At termination. dry weights were made on the contents of the flasks and carotene and xanthophyll determinations made on the centrifuged cells. Results are shown below.

TABLE II

[Growth and carotenoid production by algal cells grown in a 1.0% dextrose medium containing different levels of corn steep liquor and urea as nitrogen sources.]

| Corn Steep Liquor, Percent | Urea, Percent | Dry Wt. of Cells, g./ medium | Beta-carotene | | Xanthophyll | |
|---|---|---|---|---|---|---|
| | | | mg./g. dry cells | mg./l medium | mg./g. dry cells | mg./l medium |
| 0.4 | 0 | 4.14 | 0.44 | 2.24 | 1.07 | 5.52 |
| 0.4 | 0.1 | 4.68 | 0.98 | 4.56 | 2.58 | 12.09 |
| 0.4 | 0.2 | 4.54 | 1.17 | 5.33 | 3.11 | 14.11 |
| 0.4 | 0.3 | 4.67 | 1.16 | 5.44 | 3.50 | 16.36 |
| 0.8 | 0 | 5.64 | 1.21 | 6.80 | 3.37 | 18.98 |
| 0.8 | 0.1 | 5.29 | 2.08 | 10.98 | 4.40 | 23.29 |
| 0.8 | 0.2 | 5.43 | 1.68 | 9.10 | 4.15 | 22.54 |

EXAMPLE 3

A series of culture flasks were made up containing 3.0% dextrose and two different levels of corn steep liquor, 0.8 and 1.2%. The corn steep liquor was supplemented with varying levels of urea (0.0 to 0.3%) added after sterilization of the basal medium. Other medium ingredients were: Sodium acetate 0.1%, $NH_4NO_3$ 0.01%, $KH_2PO_4$ 0.004%, $MgSO_4$ 0.004%, $CaCl_2$ 0.002%, $FeSO_4$ 0.00001%, ethylene diamine tetra acetic acid 0.003%, and micronutrient solution 0.1%. After the pH's of the media were adjusted to predetermined levels dependent upon the amount of urea to be added, duplicate flasks of 100 milliliters per 500 milliliter flask of each medium were prepared. After sterilization for 25 minutes at 121° C., urea was added and the flasks inoculated with 3.0% by volume of a 7 day liquid algal culture of the genus Chlorococcum. They were aerated and agitated on a reciprocal shaker for 7 days at 23° to 24° C. Light conditions consisted of two sets of ceiling fixtures, each possessing two 75 watt incandescent bulbs approximately 5 feet above the shaker. At termination, dry weights were made on the contents of the flasks and carotene and xanthophyll determinations made on the centrifuged cells. Results are shown in Table III.

TABLE III

[The growth of and carotenoid production by algae grown in a 3.0% dextrose medium containing different levels of corn steep liquor and urea as sources of nitrogen.]

| Corn Steep Liquor, Percent | Urea, Percent | Dry Wt. of Cells, g./l. medium | Beta-carotene | | Xanthophyll | |
|---|---|---|---|---|---|---|
| | | | mg./g. dry cells | mg./l. medium | mg./g. dry cells | mg./l. medium |
| 0.8 | 0 | 9.17 | 0.43 | 3.92 | 1.36 | 12.46 |
| 0.8 | 0.1 | 14.15 | 1.13 | 15.92 | 3.14 | 44.40 |
| 0.8 | 0.2 | 14.12 | 1.06 | 15.02 | 3.24 | 45.68 |
| 0.8 | 0.3 | 14.20 | 1.19 | 16.87 | 3.12 | 44.29 |
| 1.2 | 0 | 11.33 | 0.39 | 4.42 | 1.50 | 17.02 |
| 1.2 | 0.1 | 14.18 | 0.80 | 11.27 | 2.53 | 35.89 |
| 1.2 | 0.2 | 13.20 | 1.58 | 20.40 | 3.78 | 48.69 |
| 1.2 | 0.3 | 14.80 | 1.34 | 20.12 | 3.77 | 56.49 |

No. 2:
Dextrose _____ 2.0
Corn steep liquor [1] _____ 1.5
Enzymatically degraded collagen [1] (Wilson & Co. W-159) _____ 0.5
Tapwater.

[1] 50% solids.
[2] The urea was added after sterilization.
[3] The micronutrient solution utilized had the following composition:

| | G. |
|---|---|
| $H_3BO_3$ | 2.86 |
| $MnCl_2.4H_2O$ | 1.81 |
| $ZnSO_4.7H_2O$ | 0.222 |
| $CuSO_4.5H_2O$ | 0.079 |
| $MoO_3$ | 0.015 |
| $Ca(NO_3)_2.4H_2O$ | 59.0 |
| $CaCl_2.6H_2O$ | 0.04 |

Water to make 1 liter.

Cultural conditions:
(1) 23° C. for 11 days; agitation provided by rotary shaker—200 r.p.m.
(2) 3% inoculum of 7 day cultures.
(3) Illumination: Four 75 watt incandescent bulbs in room.
(4) Medium volume—100 ml./500 ml. flask.
The following results were obtained:

TABLE IV

| Culture | Culture Medium No. | Urea, Percent | Dry Wt., g./l. med. | Carotene | | Xanthophyll | |
|---|---|---|---|---|---|---|---|
| | | | | mg./g. dry [1] | mg./l. med.[2] | mg./g. dry [1] | mg./l. med.[2] |
| Chlorococcum (see Preparation of Inoculum) | 1 | 0 | 9.30 | 0.35 | 3.26 | 1.23 | 11.45 |
| | 1 | 0.3 | 8.59 | 2.03 | 17.44 | 4.74 | 40.72 |
| | 2 | 0 | 8.55 | 0.80 | 6.84 | 2.71 | 23.17 |
| | 2 | 0.3 | 8.56 | 1.83 | 15.61 | 4.89 | 41.71 |
| Chlorella vulgaris var viridis | 1 | 0 | 4.05 | 0 | 0 | 0.84 | 3.40 |
| | 1 | 0.3 | 7.34 | 0 | 0 | 1.34 | 9.84 |
| | 2 | 0 | 4.27 | 0 | 0 | 0.80 | 3.42 |
| | 2 | 0.3 | 7.24 | 0.43 | 3.11 | 2.30 | 16.65 |
| Stichococcus bacillaris | 1 | 0 | 8.05 | 0 | 0 | 0.81 | 6.52 |
| | 1 | 0.3 | 8.80 | 0.12 | 1.06 | 1.28 | 11.26 |
| | 2 | 0 | 9.95 | 0 | 0 | 0.50 | 5.00 |
| | 2 | 0.3 | 9.65 | 0.09 | 0.87 | 1.37 | 13.23 |
| Chlamydomonas agloeformis | 1 | 0 | 8.58 | 0.33 | 2.83 | 1.33 | 11.41 |
| | 1 | 0.3 | 6.94 | 1.41 | 9.64 | 4.82 | 32.97 |
| | 2 | 0 | 6.77 | 0.76 | 5.15 | 2.72 | 18.44 |
| | 2 | 0.3 | 4.63 | 1.84 | 8.52 | 5.78 | 26.76 |
| Chlorella vulgaris ATCC 9765 | 1 | 0 | 11.22 | 0.09 | 1.01 | 0.82 | 9.20 |
| | 1 | 0.3 | 9.25 | 0.28 | 2.59 | 1.92 | 17.76 |
| | 2 | 0 | 13.51 | 0.60 | 8.11 | 1.30 | 17.56 |
| | 2 | 0.3 | 12.05 | 1.01 | 12.17 | 2.50 | 30.13 |
| Chlorella pyrenoidosa ATCC 7516 | 1 | 0 | 4.64 | 0 | 0 | 0.51 | 2.37 |
| | 1 | 0.3 | 8.83 | 0.06 | 0.53 | 0.65 | 5.75 |
| | 2 | 0 | 5.08 | 0 | 0 | 0.28 | 1.42 |
| | 2 | 0.3 | 9.07 | 0.05 | 0.45 | 0.30 | 2.72 |

[1] Milligrams per gram of dry cells.
[2] Milligrams per liter of medium.

EXAMPLE 4

This example illustrates the results obtained in the cultivation of various strains of algae in two different media when utilizing urea as a supplementary source of nitrogen. The technique used in the cultivation of the various algae was the same as that employed in the previous examples. The constituents used in the media and specific growth conditions are as follows:

Culture medium

No. 1:
| | Percent |
|---|---|
| Dextrose | 2.0 |
| Corn steep liquor [1] | 0.8 |
| Sodium acetate | 0.1 |
| $NH_4NO_3$ | 0.01 |
| $KH_2PO_4$ | 0.004 |
| $MgSO_4$ | 0.004 |
| $CaCl_2$ | 0.002 |
| Ethylenediamine tetra-acetic acid | 0.003 |
| $FeSO_4$ | 0.00001 |

Urea [2] (See Table IV)
Micronutrients,[3] 0.1 ml./liter of medium.

EXAMPLE 5

This example illustrates the results obtained in a plurality of experiments in the cultivation of the alga Chlorococcum utilizing a variety of proteinaceous materials in the nutrient medium. The experiment illustrates the results obtained both with and without the use of urea as a nitrogen supplement. The techniques and basal medium utilized were indentical with Example 4, Medium No. 1. The type and amount of proteinaceous material and the amount of urea used in each instance are shown in Table V below. The cultural conditions are as follows:

(1) 3% inoculum of a 7 day culture of alga of the genus Chlorococcum (see: Preparation of Inoculum, supra).
(2) Incubate at 23° C. on a rotary shaker (200 r.p.m.) for 11 days.
(3) Illumination: Four 75 watt incandescent bulbs in the room.
(4) Equipment: 100 ml. of culture medium in a 500 ml. glass flask.

The following results were obtained:

TABLE V

| Nitrogen Source | Level, Percent | Urea, Percent | Dry wt., g./l. med. | Carotene mg./g. dry [1] | Carotene mg./l. med.[2] | Xanthophyll mg./g. dry [1] | Xanthophyll mg./l. med.[2] |
|---|---|---|---|---|---|---|---|
| Distiller's Solubles syrup [3] | 2.0 | 0 | 9.77 | 0 | 0 | 0.59 | 5.74 |
| | | 0 | 9.73 | | | | |
| | | 0.1 | 8.78 | 0.45 | 4.01 | 2.48 | 22.10 |
| | | 0.1 | 9.05 | | | | |
| | | 0.3 | 9.68 | 0.60 | 5.95 | 2.60 | 25.79 |
| | | 0.3 | 10.16 | | | | |
| Soy albumin | 0.4 | 0 | 8.30 | 0 | 0 | 0.57 | 5.12 |
| | | 0 | 9.68 | | | | |
| | | 0.1 | 8.90 | 0.84 | 7.15 | 2.86 | 24.34 |
| | | 0.1 | 8.11 | | | | |
| | | 0.3 | 8.04 | 1.01 | 8.12 | 3.41 | 27.42 |
| | | 0.3 | 5.72 | | | | |
| Lactalbumen | 0.4 | 0 | 9.29 | 0.07 | 0.71 | 0.41 | 4.14 |
| | | 0 | 10.93 | | | | |
| | | 0.1 | 11.12 | 0.25 | 2.82 | 1.24 | 13.97 |
| | | 0.1 | 11.43 | | | | |
| | | 0.3 | 10.78 | 0.24 | 2.52 | 1.25 | 13.18 |
| | | 0.3 | 10.39 | | | | |
| Beef extract | 0.4 | 0 | 8.63 | 0.19 | 1.77 | 1.14 | 10.62 |
| | | 0 | 10.02 | | | | |
| | | 0.1 | 9.67 | 1.11 | 10.43 | 2.85 | 26.79 |
| | | 0.1 | 9.13 | | | | |
| | | 0.3 | 9.79 | 1.05 | 9.67 | 2.70 | 24.87 |
| | | 0.3 | 8.64 | | | | |
| Whey | 0.4 | 0 | 6.37 | 0 | 0 | 0.55 | 3.61 |
| | | 0 | 6.75 | | | | |
| | | 0.1 | 8.30 | 0.21 | 1.78 | 2.34 | 19.82 |
| | | 0.1 | 8.65 | | | | |
| | | 0.3 | 9.01 | 0.22 | 1.93 | 2.26 | 19.85 |
| | | 0.3 | 8.55 | | | | |
| Yeast hydrolyzate (enzyme) | 0.4 | 0 | 8.33 | 0.93 | 7.64 | 2.26 | 18.55 |
| | | 0 | 8.09 | | | | |
| | | 0.1 | 9.88 | 1.15 | 9.04 | 3.66 | 28.70 |
| | | 0.1 | 5.79 | | | | |
| | | 0.3 | 7.20 | 1.46 | 10.25 | 4.63 | 32.50 |
| | | 0.3 | 6.84 | | | | |
| Casein hydrolyzate (acid) | 0.4 | 0 | 8.92 | 0.42 | 3.74 | 1.47 | 13.09 |
| | | 0 | 8.90 | | | | |
| | | 0.1 | 7.21 | 0.94 | 6.89 | 2.55 | 18.70 |
| | | 0.1 | 7.43 | | | | |
| | | 0.3 | 8.16 | 0.83 | 6.68 | 2.57 | 20.70 |
| | | 0.3 | 7.93 | | | | |
| S.P. Peptone [4] | 0.2 | 0 | 10.72 | 0.16 | 1.72 | 0.74 | 7.94 |
| | 0.2 | 0.3 | 9.04 | 0.63 | 5.66 | 2.97 | 26.67 |
| Nutri peptone [4] | 0.2 | 0 | 9.75 | 0.16 | 1.56 | 0.95 | 9.26 |
| | 0.2 | 0.3 | 7.92 | 0.58 | 4.61 | 3.14 | 24.96 |
| Thio-peptone [4] | 0.2 | 0 | 10.83 | 0.30 | 3.25 | 1.58 | 17.11 |
| | 0.2 | 0.1 | 8.00 | 0.85 | 6.83 | 4.65 | 37.39 |
| Soy peptone [5] | 0.2 | 0 | 9.38 | 0.32 | 3.00 | 0.79 | 7.41 |
| | 0.2 | 0.1 | 7.80 | 0.44 | 3.43 | 3.04 | 23.71 |

[1] Milligrams per gram of dry cells.
[2] Milligrams per liter of medium.
[3] 25% solids.
[4] Wilson Laboratories, Chicago, Ill.
[5] Case Laboratories, Chicago, Ill.

EXAMPLE 6

An experiment substantially along the lines of that in Example 5 was carried out to compare the results obtained by the use of the carbohydrates, dextrose and mannose, as nutrients in the production of carotenoids by the cultivation of an alga of the genus Chlorococcum. The conditions employed were identical with those set forth in Example 4 as was the basal medium with the exception of the carbohydrate and urea which are set forth in the following table:

TABLE VI

| Carbohydrate | Percent | Urea, percent | Dry Wt., g./l. med. | Carotene mg./g. dry | Carotene mg./l. med. | Xanthophyll mg./g. Dry | Xanthophyll mg./l. med. |
|---|---|---|---|---|---|---|---|
| Dextrose | 2.0 | 0 | 9.82 | 0.73 | 6.94 | 2.07 | 16.69 |
| | | 0 | 9.20 | | | | |
| | | 0.3 | 9.21 | 1.88 | 16.37 | 4.37 | 38.06 |
| | | 0.3 | 8.21 | | | | |
| Mannose | 2.0 | 0 | 3.54 | 1.08 | 3.75 | 3.53 | 12.25 |
| | | 0 | 3.40 | | | | |
| | | 0.3 | 2.81 | 1.09 | 2.67 | 3.98 | 9.75 |
| | | 0.3 | 2.09 | | | | |

In experiments similar to the foregoing, it was also found that the use of several other carbohydrates in conjunction with urea in the nutrient medium resulted in excellent yields of carotenoids. For example, the use of 2% enzyme degraded starch and 0.3% urea gave yields of 3.96 milligrams of xanthophyll per gram of dry cells or 42.89 milligrams per liter of medium. Similar results were obtained with a medium containing cerelose in place of dextrose and the same level of urea. In both experiments, the source of protein nitrogen was corn steep liquor—0.8% (0.4% on a dry solids basis).

As may be seen from the foregoing experiments, the process of the present invention results in the production of enhanced yields of carotene and xanthophyll by efficient and economical means. Thus, at a carbohydrate (dextrose) level of 1%, the addition of 0.1% of urea results in an increase of about 100% in the production of carotene and xanthophyll, as seen in Example 1, Table I. In Example 2 using media containing varying amounts of proteinaceous material (corn steep liquor) as a nutrient, similar benefits may also be observed. With respect to Example 3, cultures of algae on a growth medium containing 3% dextrose and varying amounts of corn steep liquor, the addition of as little as 0.1% of urea results in an increase of about 400% in beta-carotene production and an increase of about 350% in xanthophyll production. It is to be noted that these increased yields are obtained in periods of time which are substantially less than the culture period which has been utilized under the procedures of the prior art wherein the culture period extended from 20 up to about 50 days.

Examples 4, 5 and 6 show that similar results are obtained with other algae of the division Chlorophyta utilizing urea as a nitrogen supplement in culture media using a variety of proteinaceous materials and carbohydrates as nutrients.

It will be appreciated that the carotenoids produced by the algae may be separated from the cells in accordance with conventional processes which may or may not involve solvent extraction. They are useful for incorporation into animal feeds either as coloring materials or other purposes known to the art. If desired, the algae cells themselves containing the high carotene and xanthophyll concentrations may be advantageously added directly to an animal feed, particularly poultry feeds.

While several particular embodiments of this invention are suggested above, it will be understood, of course, that the invention is not to be limited thereto since many modifications may be made and it is contemplated therefore by the appended claims to cover any such modifications as fall within the true spirit and scope of this invention.

What is claimed is:

1. A process for the production of carotenoids which comprises cultivating a green alga of the division Chlorophyta in an aqueous organic nutrient medium containing a fermentable carbohydrate, between about 0.1 and about 5 percent by weight of a proteinaceous material, and between about 0.05 and about 4 percent by weight of urea.

2. A process for the production of carotenoids which comprises cultivating, under heterotrophic conditions, an alga of the division Chlorophyta in an aqueous organic nutrient medium, said medium containing in excess of about 0.5 percent by weight of a fermentable carbohydrate, between about 0.1 and about 5 percent by weight of a proteinaceous material, and between about 0.05 and about 4 percent by weight of urea.

3. The process of claim 2 wherein the alga is of the genus Chlorococcum.

4. The process of claim 2 wherein the alga is of the genus Chlorella.

5. The process of claim 2 wherein the alga is of the genus Chlamydomonas.

6. A process for the production of carotenoids which comprises cultivating under heterotrophic conditions an alga of the division Chlorophyta in an aqueous organic nutrient medium, at a temperature of from about 10° to about 40° C., said nutrient medium containing between about 0.5 and about 10 percent by weight of a carbohydrate, between about 0.1 and about 5 percent by weight of a proteinaceous material and between about 0.05 and about 4 percent by weight of urea.

7. The process of claim 6 wherein the alga is of the order Chlorococcales.

8. The process of claim 6 wherein the alga is of the family Oöcystaceae.

9. The process of claim 6 wherein the alga is of the genus Chlorococcum.

10. The process of claim 6 wherein the alga is of the genus Chlorella.

11. The process of claim 6 wherein the alga is of the genus Chlamydomonas.

12. The process of claim 6 wherein the alga is *Chlorella vulgaris*.

13. The process of claim 6 wherein the alga is *Chlorella pyrenoidosa*.

14. The process of claim 6 wherein the cultivation is carried out at a temperature of from 10° to 40° C.

15. The process of claim 6 wherein the pH of the nutrient medium is from about 5.0 to 9.

16. The process of claim 6, wherein the proteinaceous material is corn steep liquor.

17. The process of claim 6 wherein the proteinaceous material is an enzymatically degraded collagenous material.

18. The process of claim 6 wherein the cultivation is carried out under low light conditions.

19. The process of claim 6 wherein the cultivation is carried out with accompanying agitation and aeration.

20. A process for the production of carotenoids which comprises cultivating a green algae of the division Chlorophyta under submerged aeration conditions in an aqueous medium containing in excess of about 0.5 percent by weight of a fermentable carbohydrate, between about 0.4 and 0.8 percent by weight of a proteinaceous material for each one percent of carbohydrate present, and between about 0.1 to 0.4 percent of urea for each one percent of carbohydrate present.

References Cited in the file of this patent

UNITED STATES PATENTS 2,498,480     Bierlich _____ Feb. 21, 1950

OTHER REFERENCES

Burkholder et al.: "Morphogenesis of Fungus Colonies in Submerged Shaken Cultures." Published July 1945 in American Journal of Botany, vol. 32, pages 424 through 431.

"Algal Culture" (Burlew), published 1953 by Carnegie Institution of Washington, D.C. as their Publication 600. Pages 122 through 126, 153, 190 through 196, 204, 205, 265 are relied on.

Pruess et al.: "Studies on the Mass Culture of Various Algae." Published May 1954 in Applied Microbiology (Magazine) vol. 2, No. 3, pages 125 through 130.

Condensed Chemical Dictionary, 5th edition, published 1956 by Reinhold (N.Y.), page 312 relied on.